US007720471B2

(12) United States Patent
Ayyagari et al.

(10) Patent No.: US 7,720,471 B2
(45) Date of Patent: May 18, 2010

(54) METHOD FOR MANAGING HIDDEN STATIONS IN A CENTRALLY CONTROLLED NETWORK

(75) Inventors: Deepak Ayyagari, Vancouver, WA (US); Sherman L. Gavette, Camas, WA (US)

(73) Assignee: Sharp Laboratories of America, Camas, WA (US)

( * ) Notice: Subject to any disclaimer, the term of this patent is extended or adjusted under 35 U.S.C. 154(b) by 1063 days.

(21) Appl. No.: 11/388,873

(22) Filed: Mar. 24, 2006

(65) Prior Publication Data

US 2007/0026794 A1 Feb. 1, 2007

Related U.S. Application Data

(60) Provisional application No. 60/703,383, filed on Jul. 27, 2005.

(51) Int. Cl.
*H04W 4/00* (2009.01)
*H04L 1/00* (2006.01)
*H04L 12/28* (2006.01)

(52) U.S. Cl. ............... 455/426.1; 370/224; 370/254

(58) Field of Classification Search ............ 455/426.1, 455/426.2, 11.1, 7.16, 462, 443, 444, 445, 455/392, 224, 254, 223

See application file for complete search history.

(56) References Cited

U.S. PATENT DOCUMENTS

| | | | |
|---|---|---|---|
| 4,977,593 A | 12/1990 | Ballance | |
| 5,142,578 A | 8/1992 | Matyas et al. | |
| 5,185,796 A | 2/1993 | Wilson | |
| 5,204,903 A | 4/1993 | Okada et al. | |
| 5,887,063 A | 3/1999 | Varadharajan et al. | |
| 5,987,331 A | 11/1999 | Grube et al. | |
| 6,097,817 A | 8/2000 | Bilgic et al. | |
| 6,526,581 B1 | 2/2003 | Edson | |
| 6,559,757 B1 | 5/2003 | Deller et al. | |
| 6,594,268 B1 | 7/2003 | Aukia et al. | |
| 6,759,946 B2 | 7/2004 | Sahinoglu et al. | |
| 6,775,280 B1 | 8/2004 | Ma et al. | |
| 6,782,476 B1 | 8/2004 | Ishibashi | |
| 6,901,064 B2 | 5/2005 | Cain et al. | |
| 7,200,147 B2 * | 4/2007 | Shin et al. ................... | 370/392 |

(Continued)

FOREIGN PATENT DOCUMENTS

EP 0 844 563 B1 1/2003

(Continued)

OTHER PUBLICATIONS

David Ruiz et al., "In-Home AV PLC MAC with Neighboring Networks Support," IEEE, 2005, p. 17,rt. hand colum, line 14-p. 20, rt. hand colum, line 16; and Figs. 2,3, & 6.

(Continued)

*Primary Examiner*—Tilahun Gesesse
(74) *Attorney, Agent, or Firm*—Michael Blaine Brooks, PC; Rosemarie F. Jones; David Ripma

(57) ABSTRACT

The embodiments of the present invention provide methods, devices, and systems enabling a central coordinator to manage hidden stations via a proxy central coordinator, where a hidden station is discovered based on beacons and made known to other networked devices via transmitted lists.

19 Claims, 8 Drawing Sheets

U.S. PATENT DOCUMENTS

| | | |
|---|---|---|
| 7,212,513 B2 * | 5/2007 | Gassho et al. ............... 370/338 |
| 7,242,932 B2 * | 7/2007 | Wheeler et al. .......... 455/435.1 |
| 7,330,457 B2 * | 2/2008 | Panwar et al. ................ 370/338 |
| 7,342,896 B2 * | 3/2008 | Ayyagari .................... 370/254 |
| 7,356,010 B2 * | 4/2008 | He et al. ...................... 370/338 |
| 7,496,078 B2 * | 2/2009 | Rahman ..................... 370/338 |
| 7,506,042 B2 * | 3/2009 | Ayyagari .................... 709/223 |
| 2001/0048692 A1 | 12/2001 | Karner |
| 2002/0116342 A1 | 8/2002 | Hirano et al. |
| 2002/0150249 A1 | 10/2002 | Ohkita et al. |
| 2002/0163933 A1 | 11/2002 | Benveniste |
| 2003/0038710 A1 | 2/2003 | Manis et al. |
| 2003/0039257 A1 | 2/2003 | Manis et al. |
| 2003/0051146 A1 | 3/2003 | Ebina et al. |
| 2003/0056014 A1 | 3/2003 | Verberkt et al. |
| 2003/0066082 A1 | 4/2003 | Kliger et al. |
| 2003/0198246 A1 | 10/2003 | Lifshitz et al. |
| 2003/0203716 A1 * | 10/2003 | Takahashi et al. .......... 455/11.1 |
| 2003/0231607 A1 | 12/2003 | Scanlon et al. |
| 2004/0013135 A1 | 1/2004 | Haddad |
| 2004/0066783 A1 | 4/2004 | Ayyagari |
| 2004/0075535 A1 | 4/2004 | Propp et al. |
| 2004/0165728 A1 | 8/2004 | Crane et al. |
| 2004/0174829 A1 * | 9/2004 | Ayyagari .................... 370/254 |
| 2004/0214570 A1 | 10/2004 | Zhang et al. |
| 2005/0015805 A1 | 1/2005 | Iwamura |
| 2005/0033960 A1 | 2/2005 | Vialen et al. |
| 2005/0041673 A1 | 2/2005 | Jiang et al. |
| 2005/0149757 A1 | 7/2005 | Corbett et al. |
| 2005/0169222 A1 | 8/2005 | Ayyagari et al. |
| 2005/0170835 A1 | 8/2005 | Ayyagari et al. |
| 2005/0174950 A1 * | 8/2005 | Ayyagari .................... 370/254 |
| 2005/0193116 A1 | 9/2005 | Ayyagari et al. |
| 2006/0007907 A1 | 1/2006 | Shao et al. |
| 2006/0031477 A1 * | 2/2006 | Ayyagari .................... 709/224 |

FOREIGN PATENT DOCUMENTS

| | | |
|---|---|---|
| EP | 1 693 998 A1 | 8/2006 |
| WO | WO 03/015291 A2 | 2/2003 |
| WO | WO 03/026224 A1 | 3/2003 |
| WO | WO 2005/062546 A1 | 7/2005 |

OTHER PUBLICATIONS

Ayyagari, Deepak, "High Speed Home Networking for AV and IP Applications using existing Powerline Infrastructure,"Dec. 2004,p. 65-72,paras:[0001]&[0004],Sharp Technical Journal.

* cited by examiner

METHOD FOR MANAGING HIDDEN STATIONS IN A CENTRALLY CONTROLLED NETWORK

CROSS-REFERENCE TO RELATED APPLICATIONS

This application claims the benefit of U.S. Provisional Patent Applications Ser. No. 60/703,383 filed Jul. 27, 2005, entitled "Method for Managing Hidden Stations in a Centrally Controlled Network," which is hereby incorporated by reference herein for all purposes.

FIELD OF THE INVENTION

The present invention is related to networks and particularly managing hidden stations within centralized networks.

BACKGROUND

Access to the network medium may be shared by multiple devices, which may interfere with one another, even if they belong to different communication networks. The interference environment, coupled with the nature of the line channel, gives rise to situations where certain devices that belong to the same network, e.g., a home network, may not be able to communicate with a central coordinator that coordinates and manages the activities of that particular network. A way to manage these hidden devices that are otherwise unable to communicate with a central coordinator for lack of receiving beacon signals is thus desirable.

SUMMARY

In one aspect of the invention, a method of communication between a first device and a second device within a centralized network is provided. The centralized network includes a central coordinator that manages the network activities of the centralized network and a proxy station. The method includes the steps of sending by the first device, unable to decode messages sent by the second device, a message comprising a message payload and at least one indicator identifying that the message is to be relayed by the proxy station; extracting, by the proxy station, the message payload from the sent message from the first device; sending by the proxy station, a relayed message comprising the extracted message payload and at least one indicator identifying that the message is for the second device; and extracting by the second device, the extracted message payload from the relayed message.

In another aspect of the invention, a method of managing a centralized network is provided. The network includes a central coordinator, a proxy coordinator, and at least one hidden station. The method includes the steps of transmitting by the central coordinator central beacons comprising network bandwidth (BW) scheduling allocation for the centralized network; receiving at least one of the central beacons by the proxy coordinator, wherein the proxy coordinator manages bandwidth allocation of a proxy network, and wherein the at least one hidden station is part of the proxy network; sending by the proxy station at least one proxy beacon based on the received at least one central beacon; and decoding by the at least one hidden station the proxy beacon.

In another aspect of the invention, a method of managing a centralized network is provided. The network includes a central coordinator, a proxy station, and at least one hidden station. The method includes the steps of transmitting, by the central coordinator (CCO), a CCO discover beacon that includes information identifying the CCO; transmitting, by the proxy station (PSTA), a PSTA discover beacon that includes information identifying the PSTA; transmitting, by the at least one hidden station (HSTA), an HSTA discover beacon that includes information identifying the HSTA; updating, by the CCO, a CCO discovered station list and a CCO discovered network list based on the PSTA discover beacon; updating, by the PSTA, a PSTA discovered station list and a PSTA discovered network list based on the CCO discover beacon and the HSTA discover beacon; and updating by the CCO a network topology based on the CCO discovered station list, the CCO discovered network list, the PSTA discovered station list, and the PSTA discovered network list.

In another aspect of the invention, a device is provided. This device is adapted to be coupled to a centralized network, which includes one or more stations. The device includes a discovery module, a schedule beacon analyzer module, and an input/output interface. The discovery module is adapted to transmit beacons identifying the device, receive beacons from the one or more stations identifying the one or more stations in the centralized network, update a discovered station list based on the received beacons, update a discovered network list based on the received beacons, transmit the discovered station list, and transmit the discovered network list. The schedule beacon analyzer module is operably coupled to the discovery module and is adapted to determine network scheduling information based on beacons received by the device. The input/output interface, on the other hand, is operably coupled to the discovery module and the schedule beacon analyzer module.

In another aspect of the invention, a device that is adapted to be coupled to a centralized network is provided. The network typically includes one or more stations. The device includes a discover module, a network management module, a relay-to-proxy module, and an input/output interface. The discovery module is adapted to transmit beacons identifying the device, receive beacons from the one or more stations identifying the one or more stations in the centralized network, update a device discovered station list based on the received beacons, update a device discovered network list based on the received beacons, receive discovered station lists from the one or more stations in the centralized network, receive discovered network lists from the one or more stations in the centralized network, and generate network topology information based on the device discovered station list, the device discovered network list, the discovered stations lists from the one or more stations, and the discovered network lists from the one or more stations. The network management module is adapted to transmit central beacons comprising network scheduling information for the one or more stations in the centralized network. The relay-to-proxy module, on the other hand, is adapted to encapsulate a message payload to be relayed, and extract a message payload. The input/output interface is operably coupled to the discovery module and network management module.

BRIEF DESCRIPTION OF THE DRAWINGS

The present invention is illustrated by way of example and not limitation in the figures of the accompanying drawings, and in which.

DETAILED DESCRIPTION OF THE INVENTION

Figure 1:
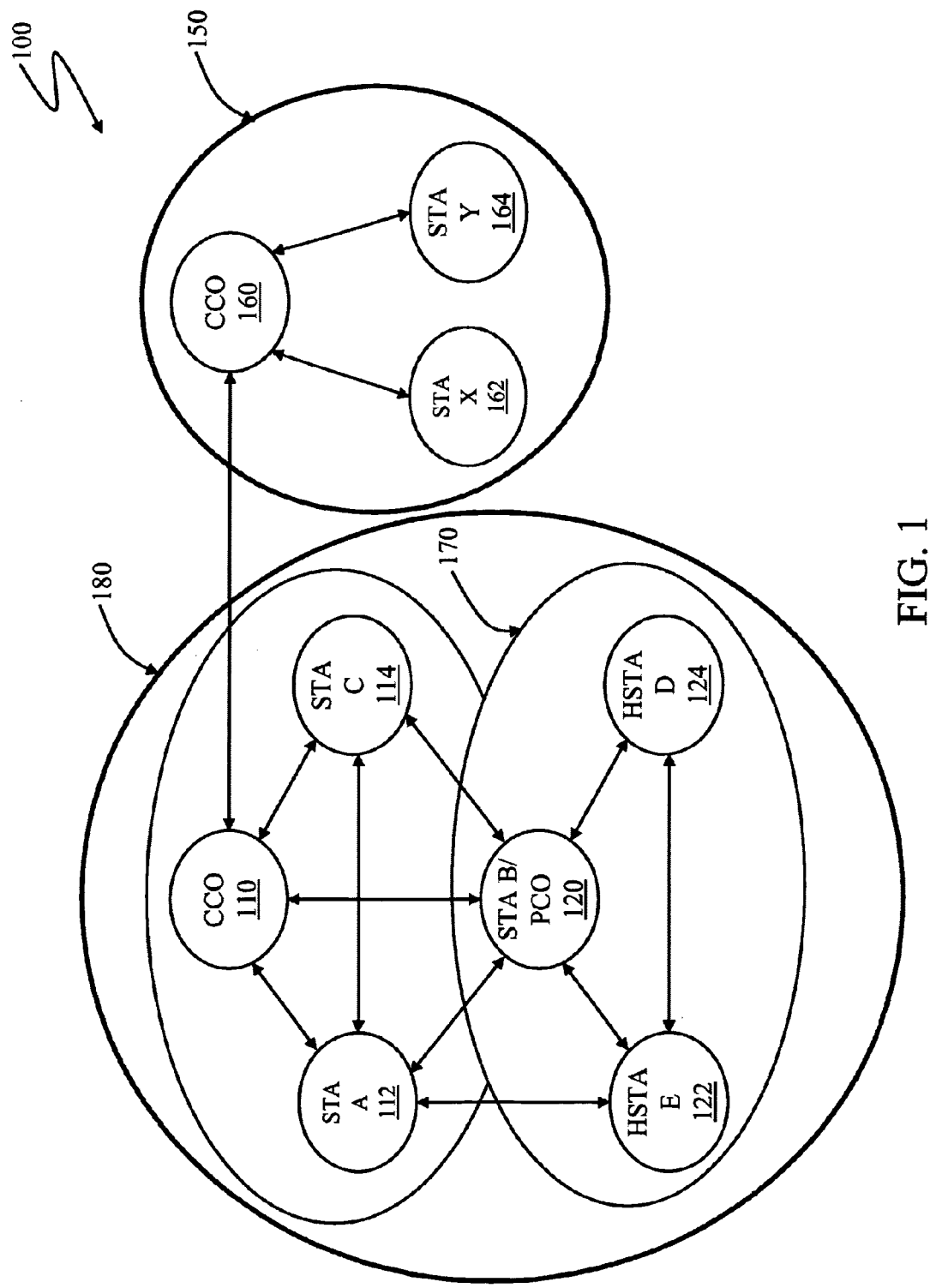
FIG. 1 is a high-level block diagram of an exemplary data communication system, according to an embodiment of the invention.
Figure 2:
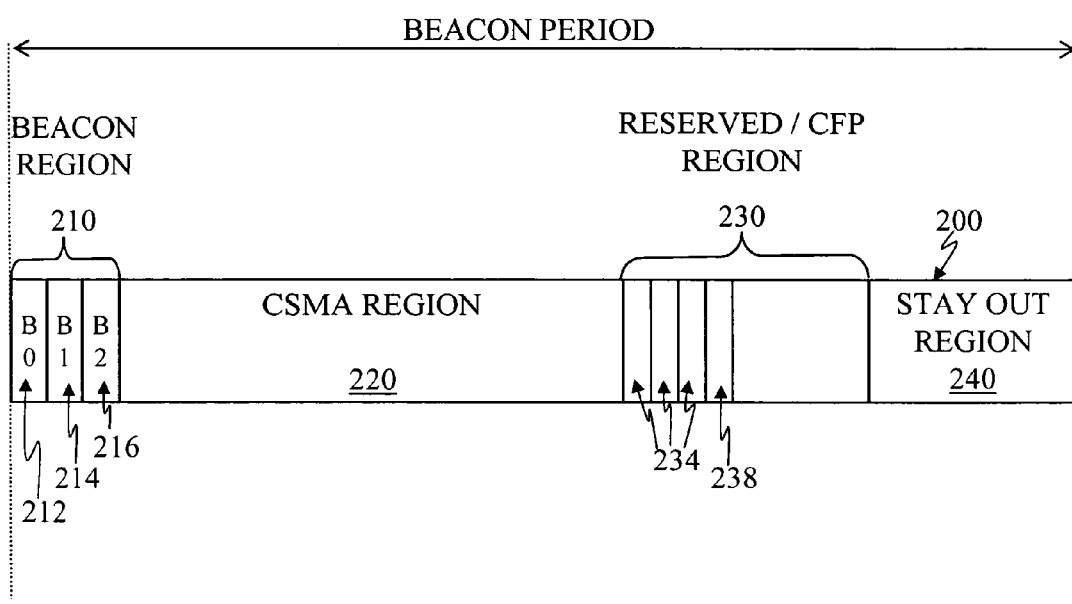
FIG. 2 is an exemplary beacon structure according to an embodiment of the invention.

To better understand the figures, reference numerals within the one hundred series, for example, 100 and 162, are initially introduced in FIG. 1, reference numerals in the two hundred series, for example, 200 and 234, are initially introduced in FIG. 2, and so on and so forth. So, reference numerals in the eight hundred series, e.g. 810 and 840, are initially introduced in FIG. 8.

FIG. 1 is a high-level block diagram of an exemplary data communication system 100 according to an embodiment of the invention. This exemplary system 100 is a power line data communication system that has data communication over power lines. Power line communication (PLC), sometimes also called broadband over power line, is a wire-based technology—which in particular uses medium and low voltage power lines for data communications. These power line networks include networks created by using electrical wirings, for example, in homes and buildings. Data communicated for example, include, but are not limited to, music, streaming videos, files, databases, text files, control commands, and network keys.

The exemplary communication system 100 includes two centralized networks (CNs) 150, 180, which are neighbor networks to each other. Each CN 150, 180 includes a central network coordinator also called the central coordinator (CCO) 110, 160 that controls network activities, such as network timing, bandwidth allocation, and security, e.g., authentication and key management. In some embodiments, a CCO controls network scheduling and allocation using beacons, e.g., central beacons. For each centralized network 150, 180 there is typically several stations/devices 112, 114, 120, 122, 124, 162, 164 with one station functioning as a CCO 110, 160. Any station (STA) typically may function as the CCO provided it has the sufficient management functionality. Stations that may be connected to this PLC network include devices such as monitors, TVs, VCRs, DVD player/recorders, other audiovisual devices, computers, game consoles, sound systems, information appliances, smart-home technology appliances, home audio equipment, or any other device that is PLC-enabled or compatible, or is able to communicate via the power lines. Although the embodiments of the invention herein are exemplified and discussed using power line networks, features of the present invention are also relevant to other networks; for example, but not limited to, networks that have a centralized architecture with a central coordinator controlling the activities of the stations in the network. The use of power line networks in exemplary configurations is intended to aid in understanding the features of the several embodiments of the invention.

In some embodiments of the invention, the network may use time division multiplexing (TDM) as a method of multiple data streams sharing a medium/channel according to time segments. The data streams may be reconstructed according to their time slots. In general, TDM enables several users/stations to share the same frequency by dividing it into different time slots. The stations transmit in rapid succession, one after the other, each using their own defined time slot. Time division multiple access (TDMA) and TDM are techniques known to those of ordinary skill in the art and may be used with PLC technology. The networks of the present invention may also use other time-division multiplexing technology, and other technology such as orthogonal frequency-division or combinations and variations thereof. Other technologies supporting PLC, e.g., orthogonal frequency-division multiplexing (OFDM), however, may also be used within the network.

Because of network topology and network medium characteristics, some stations in the network may not hear other stations in the network, e.g., some stations may not be heard by the CCO or the CCO may not hear particular stations. The first CN 180, for example, shows a CCO 110 controlling several stations, "STA A" 112, "STA B" 120, "STA C" 114, "STA D" 124, and "STA E" 122. In this exemplary embodiment, STA E 122 and STA D 124 are hidden stations (HSTAs) because they do not hear beacons broadcasted by the CCO. Non-hidden stations A 112, B 120, and C 114, however, are able to hear and decode beacons transmitted by the CCO. STAs may also directly communicate with other STAs in the CN, e.g., "STA A" 112 with "HSTA E" 122, provided the power line channel characteristics between the two communicating STAs enable such communication. Such communication links in the CN may be bi-directional or unidirectional.

Although hidden stations 122, 124 are unable to directly decode or hear beacons transmitted by the CCO, the hidden stations are typically able to hear and/or be heard by at least one other station in the network. In this exemplary embodiment, STA B 120 also functions as a proxy station (PSTA). A proxy station is a station that relays messages between the CCO and the hidden station and/or vice versa. In some embodiments, the proxy station may also relay between two stations. A proxy station may also function as a proxy coordinator. A proxy coordinator (PCO) 120 is similar to a CCO, but manages the activities of hidden stations within the network, particularly a proxy network (PXN) 170, by transmitting proxy beacons. (A CCO manages the activities of the CN typically via central beacons.) A proxy network 170 is typically a network established by the CCO when it appoints a PCO to support one or more HSTAs. A PXN is typically associated with an existing CN and is typically a wholly contained part of the CN, and consists of a PCO (appointed by the CCO or by PCO self-designation) and one or more HSTAs. Multiple networks CN that are neighbors may each independently support proxy networks; for example, the second CN 150 may have its own proxy network (not shown).

A PCO, similar to the process by which a CCO transmits central beacons, transmits proxy beacons. A PCO and a PSTA, however, are also typically controlled by the CCO, such as, for example, the CCO allocating bandwidth (BW) for the PCO to transmit proxy beacons or the CCO allocating BW for the PSTA or PCO to relay messages to the CCO. In this exemplary embodiment, the PXN 170, controlled by the PCO/STA B 120, is a subset of the centralized network managed by the CCO 110. The exemplary communication system 100 in some embodiments may have more than one PSTA and/or PCO.

The exemplary communication system 100 of the present invention thus enables a CCO to manage hidden stations via a proxy station and/or proxy coordinator. Messages from the CCO to hidden stations and messages from the hidden stations to the CCO are relayed by a proxy station and/or proxy coordinator. The CCO also determines the network topology by a discover process that typically involves transmitting discover beacons that identify stations within the network.

A power line medium may be shared by multiple devices, which may interfere with each other. In some embodiments, each CCO typically maintains an Interfering Network List (INL). In some exemplary embodiments, the CCO of each CN, for example, at network initialization, determines its interfering network list (INL) by decoding all existing beacons. It may also monitor existing beacons to update its INL, if necessary, as existing neighboring networks are shut down and new neighboring networks are established. In some embodiments, each CCO typically maintains an Interfering Network List (INL). The INL of a CCO (or of a centralized network) typically contains the list of networks that coordinate with and interfere with the network controlled by the CCO. In some embodiments, an assumption is made that if two CCOs are able to detect each other's beacon transmissions, the two networks controlled by the two CCOs, including all their stations, interfere with each other. In some embodiments, the CCO of each network, for example at network initialization, determines its INL by decoding all existing beacons. The CCO may also monitor existing beacons to update its INL, if appropriate, as existing neighboring networks are shut down and new neighboring networks are established.

FIG. 2 shows an exemplary beacon structure and schedule of a beacon 200, or portions thereof, according to some embodiments of the invention. This exemplary beacon, for example, allocates bandwidth (BW) allocation to the stations in the network. In some embodiments, this exemplary beacon is also used to schedule the discover process of stations within the network, as well as exchanging communications or messages between stations within the network. The CCO is typically also able to communicate outside of the network, for example, communicate with a neighbor CCO/network, e.g., CCO 110 of the first CN is able to communicate with a neighbor CCO 160 of the second CN.

Beacons are transmitted by the CCO periodically. The time duration between two beacons is called a beacon period. In some embodiments, a beacon period includes several parts or regions 210, 220, 230, 240. Each region is further typically defined into one or more time slots (e.g., slots 212, 214, 216, 234, and 238). A beacon may contain other information, such as fields and parameters. In some embodiments, a beacon period includes four regions:

Beacon Region:

In some embodiments, a beacon region 210 is the region wherein a CCO is able to transmit its own beacon, particularly the central beacon informing the CN of network scheduling activities and/or BW allocation. The beacon region generally includes a plurality of a certain number of beacon or time slots, with the duration of each beacon slot typically sufficient for the transmission of a beacon. In some embodiments, the duration of each beacon slot is equal to the sum of the duration of a beacon PHY protocol data unit (PPDU) and the interframe space.

A beacon region 210 may also consist of one to a maximum number—typically defined within the system of time slots or beacon slots. In some embodiments, the size of the beacon region, including the number of time slots, may be adjusted dynamically by the CCO. In some embodiments, each CCO typically transmits a beacon, particularly a central beacon, in one of the beacon slots within the beacon region every beacon period. For example, the first CCO 110 transmits a central beacon for the centralized network 180 in the first beacon time slot B0 212 while the second CCO 160 transmits a beacon for the second CN 150 at the second beacon slot B1 214. In some embodiments, information or data about the beacon region and/or time slots within the beacon region—for example, the number of beacon slots within the beacon region, the beacon slot ID that the CCO is using to transmit its current beacon protocol data unit, and/or the start and/or end time—are kept by the CCO and/or by the CCO of the other neighbor networks.

Carrier Sense Multiple Access (CSMA) Region or Contention Period (CP) Region:

The CSMA region 220 is a region wherein any one or more of many contention access protocols are used to share the medium and to coordinate network traffic. In some embodiments, a CSMA/CA protocol may be used. A network may have one or more CP or CSMA regions, which may be non-contiguous with each other. In some embodiments, the CSMA regions of one network 180 do not overlap with the reserved or contention-free period regions of other networks 150, particularly those in its INL. Communication, however, between two or more interfering networks may be made during overlapping CSMA regions.

For each network, a "minimum CSMA region" (MinCSMARegion) immediately following the beacon region 210 is typically supported. The minimum CSMA region, together with other CSMA regions, located elsewhere in the beacon period, for example, may be used for the following:
 (a) exchange of priority-based user data between STAs using CSMA, e.g., CSMA/CA;
 (b) new STAs, including CCOs, to associate with the network;
 (c) existing STAs to exchange management messages with the CCO (e.g., to set up a new link);
 (d) new CCOs to exchange management messages to establish new neighbor networks; and
 (e) existing neighbor central coordinators (NCCOs) to exchange management messages with the CCO (e.g., to share bandwidth, or to change the number of beacon slots).

Furthermore, in some embodiments, the allocation of a minimum CSMA region immediately following the beacon region 210 enables the beacon region 210 to increase or decrease in size without requiring a change in the schedule or locations in time within the frame, particularly of contention-free period time slots. Moreover, the minimum CSMA region enables new devices joining the centralized network to determine a CSMA region, for example, by decoding the central beacon. The new or joining station or device may then transmit network associate request messages, for example, messages requesting that the device be enabled to associate with the centralized network, within this minimum CSMA region or time slots.

Reserved Region or Contention-Free-Period (CFP) Region:

This reserved or CFP region 230 is a period when only stations or devices that have explicit authorization from the CCO are allowed to transmit. A reserved region 230 is a time interval that is typically reserved by a network. The network that has been allocated or has acquired control of the reserved region typically schedules the transmission of its contention-free links here. In addition, the CCO may also schedule CSMA allocations that may be used only by the STAs in that network. For example, time slot 238 in the reserved region 230 has been allocated by the CCO 110 to STA A 112, so that STA A 112 may freely transmit at that time slot or interval 238 without interference, conflict, or contention from other stations within that CN 180. Explained in another way, in that time slot 238, STA A 112 may freely transmit, while other stations in that network are typically silent. This allocation is typically via central beacons, such that when a station decodes its own central network beacon, information about which station is to use that time slot may also be defined within that beacon. In some embodiments, the CCO sends a message directly to the station informing that station when to transmit and sometimes even listen.

A centralized network may have any number of reserved regions in a beacon period. To be compatible, for example, when the networks are operating in the coordinated mode, other networks in its INL specify a stayout region in the same time interval, thereby enabling the device with explicit authorization to freely transmit. In one embodiment, it is possible to have two non-interfering networks specify a reserved region in the same interval.

Stayout Region:

The stayout region 240 is a period within a time frame when all stations assigned a stayout region are instructed by the CCO to remain silent, meaning no transmission. Typically, these devices are also not to use any contention access or contention-free access protocol. A stayout region 240 is assigned to avoid conflicts with a device or the CN that has been assigned a reserved region in the same time interval. In general, a network specifies a stayout region if one or more of the neighboring networks in its INL have specified a reserved or CFP region or a protected region in the same time interval.

In some embodiments of the invention, information about beacon regions, including the number of time slots are kept within the system, typically by the CCO in each network. Information about beacon slot allocations in the beacon region, as well as information about the other regions, in one embodiment, may be exchanged between CCOs, and typically broadcasted in the network. Furthermore, in some embodiments, the various types of regions need not be allocated in one contiguous time interval. This means for example, that the various types of regions may interleave each other, e.g., a time frame or beacon period includes a beacon region, followed by a CSMA region, followed by a stayout region, followed by another CSMA region, and then followed by a reserved region. The various regions within a beacon period may also be of varying sizes with varying number of time slot intervals or durations. In some embodiments, the end time of each region type within a beacon period is stored, for example, in multiples of a defined allocation time unit (e.g., "Allocation Time Unit"), e.g., 0.32 msec.

Protected Region

In alternative embodiments, a beacon period may include another region type (not shown) called a Protected Region. A network group is typically a collection of one or more centralized networks that have the same system timing, i.e., the beacon periods of these networks align with each other. When a CCO detects the existence of another group with a different timing and if it optionally decides to coordinate with networks in that group, that CCO typically specifies a protected region in the same interval where the beacon region of the other group is located. Stations in a network typically are not allowed to transmit in a protected region. Group coordination, in some embodiments, is optional. A neighboring group of networks, for example, may have a different beacon period start time.

A beacon may also contain other information, not shown in this figure. The beacon may include, for example, the transmitting device identification information and the station ID of the device allocated a particular time slot, and parameter information. In some embodiments, there are a number of beacon types. In addition to the central beacons, discover beacons may also be transmitted periodically by typically all associated and authenticated stations, including the CCO, to aid in network-topology discovery. Another type of beacon is the proxy beacon typically transmitted or broadcasted by the PCO to manage and control hidden stations.

Figure 3:
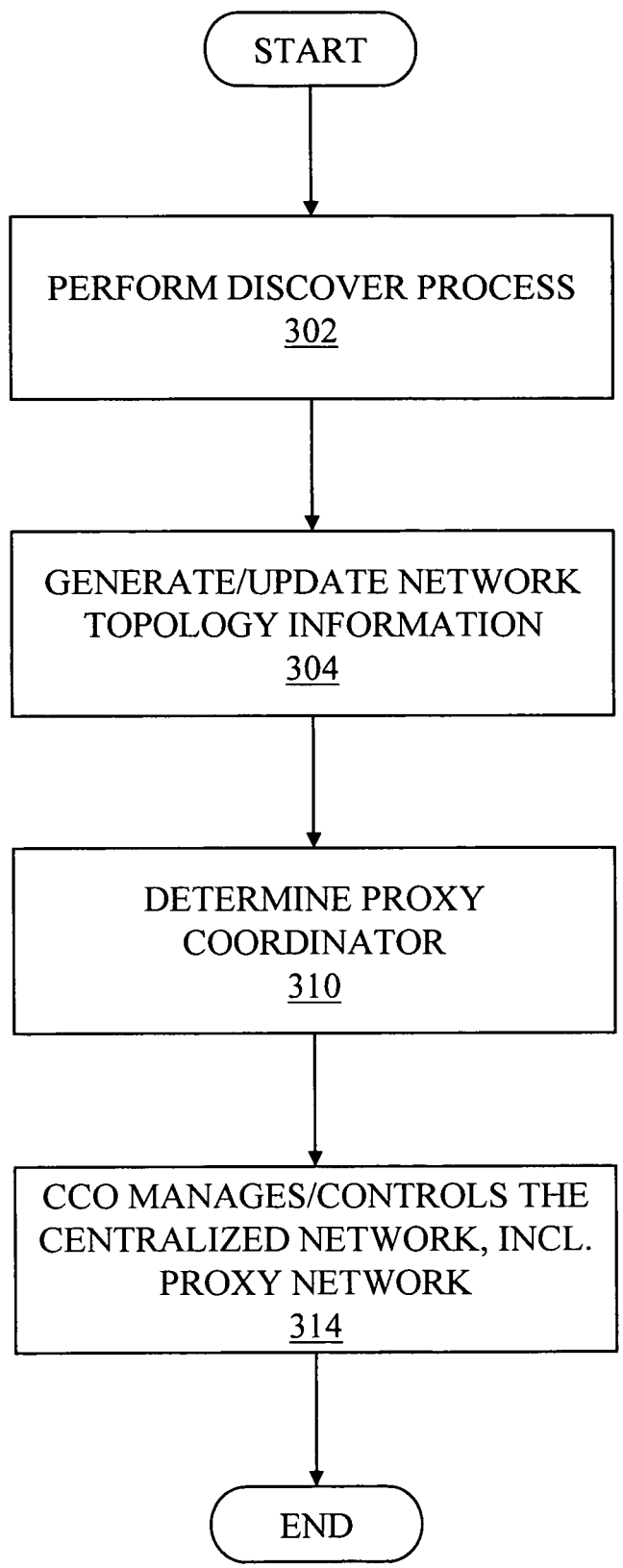
FIG. 3 is a flowchart showing a process by which a central coordinator may manage hidden stations or stations part of a proxy network, according to an embodiment of the invention.
Figure 4:
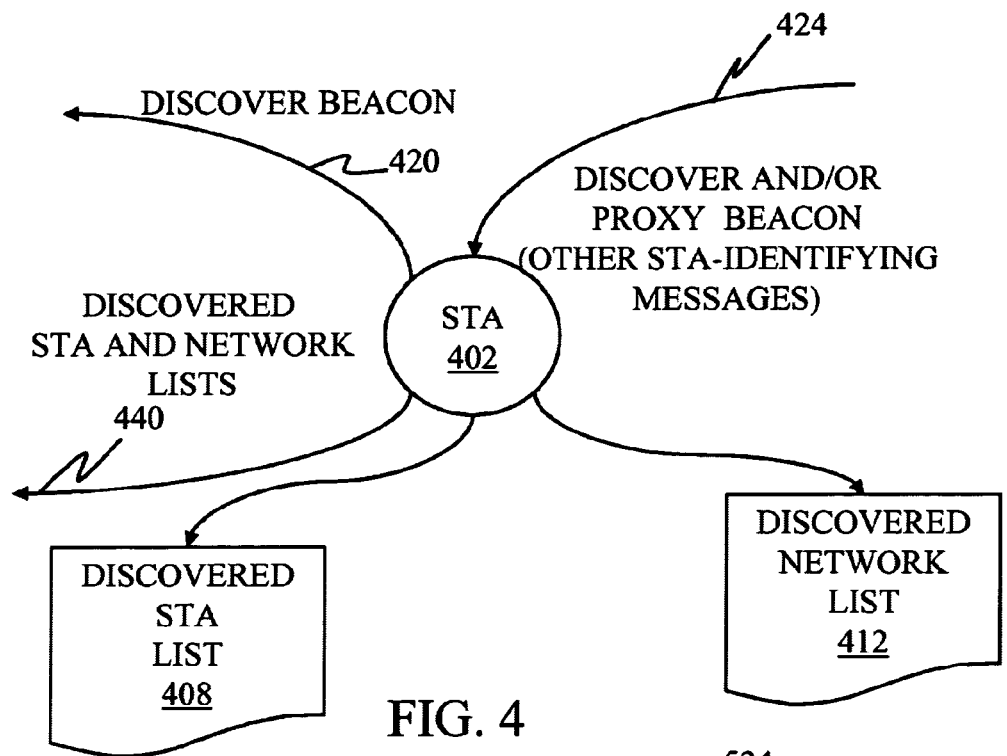
FIG. 4 is a data flow diagram of a station according to an embodiment of the invention.

FIG. 3 is a high-level flowchart showing the operations enabling a CCO to manage and control the network activities of stations, including hidden stations, within the CN. FIG. 4 is an exemplary data flow diagram of a station. FIGS. 3 and 4 are discussed together.

In the first operation, the CCO schedules a discover process for the devices within the network, which is performed by the appropriate stations within the network (step 302). In some embodiments, the discover process is a periodic background process that is ongoing within the network where typically each associated and authenticated STA, typically including the CCO, takes turn in transmitting a discover beacon as instructed or scheduled by the CCO. In some embodiments, each discover process period is identified with a start and end time and/or duration.

In some embodiments, each discover beacon includes the terminal equipment ID (TEI), the MAC address, the network ID, the number of discovered stations, the number of discovered networks, and the CCO-capability of the transmitting station. The TEI is another manner of identifying the device. The network ID is the ID identifying which CN the station is associated, because in some embodiments there are more than one CN in each data communication system. The CCO-capability indicator, for example, may indicate whether the transmitting station may function as a proxy coordinator, the level of CCO-capability, e.g., minimal or preferred/full-blown, and other granularity of CCO-capability indicators. A discover beacon may also include the network scheduling information as allocated by the CCO, for example, the network scheduling information typically contained in the central beacon or portions thereof. One of ordinary skill in the art will realize that the discover beacon may be broadcasted as several messages, as well as the information or fields contained in such messages may be varied. The presence of the scheduling information in the proxy beacons and discover beacons enables hidden stations to ascertain the network scheduling information, including the beacon region and/or at least a time slot so that a new device may exchange association request with the CCO or to transmit messages to the CCO via the proxy station.

Although a hidden station (HSTA) typically is unable to hear the beacons transmitted by the CCO, the HSTA, however, is able to determine the existence of the centralized network from discovery beacons transmitted by other STAs or proxy beacons transmitted by PCOs. For example, the discover beacon may include the network ID of a station that the HSTA is able to hear. In general, typically all devices within the network transmit a discover beacon once every discover period; even those STAs not initially instructed by the CCO to transmit beacons may be triggered or requested to broadcast discovery beacons, within the discover process. For example, HSTA E 122 and HSTA D 124 are able to ascertain that there is a CN 180 when STA B broadcasts its discover beacon. Furthermore, when STA B broadcasts its discovery beacon, containing network-scheduling information, HSTA E 122 and HSTA D 124 are able to determine time slots wherein each of them may transmit its own discovery beacon. In some embodiments, each station has the capability of transmitting discover beacons based on certain conditions such as, but not limited to, based on a periodic basis, upon receipt of an instruction from a proxy station or PCO, upon receiving or hearing a discovery beacon of another station, and upon a determined time offset after initialization or power-up. In other embodiments, a station, upon hearing a message containing source station ID sent by another station that is not in that station's discovered station list, may automatically request that other station to send a discover beacon. In some embodiments, the logic to perform the discover process, including transmitting discover beacons and updating the discovered lists, is built-in or defined within each station.

During the discover process, each STA 402 thus eventually transmits its own discover beacons 420, which depending on the medium characteristics, may be heard by various stations within the CN. Based on the discover beacons 424 heard by a station 402, including the CCO and non-hidden stations, that STA 402 updates its own discovered network list and discovered station list. Each STA typically maintains its own discovered STA list 408 and discovered network list 412. These lists may be updated based on various conditions, e.g., based on a periodic basis or based upon receipt of one or more discover beacons. Other beacons, such as central beacons and proxy beacons 424 may also trigger an update to these discovered lists. In some exemplary embodiments, these two lists may be combined into one table. The discovered station list may, for example, include the MAC address, the terminal equipment ID, a flag indicating whether the discovered station belongs to the same network, the CCO-capability, the network ID of each discovered station, and the number of stations discovered by the station. The CCO-capability indicator, for example, may indicate whether the discovered station may function as a proxy coordinator, the level of CCO-capability, e.g., minimal or preferred/full-blown, and other granularity of CCO-capability indicators. The discovered station list may also include the number of stations discovered by the station. In some embodiments, a STA based on its discovered STA list may also determine whether that STA is a HSTA. This may be done, for example, by reading its own discovered STA list and determining if any of the entry relates to a discover beacon received from a STA identified as a CCO. If no CCO discover beacon has been heard, the STA may then deduce that it is a HSTA and that it needs a PSTA or PCO to relay messages back and forth from the CCO. The PSTA or PCO that the HSTA may use may also be determined from the HSTA's discovered station list.

The STA 402 typically also transmits 440 its discovered STA list 408 and network list 412, either periodically, at the request of the CCO, or based on other conditions, which may depend on implementation and system design. Hidden stations and CCOs also create and update their own discovered STA list 408 and discovered network list 412. For hidden stations, their discovered STA lists 408 or network lists 412 are typically relayed 440 to the CCO.

The discovered network list may include, for example, a network ID, for example, identifying that CN, for example, "111" for the first CN 180 and "222" for the second CN 150, a network operating mode, for example, whether the CNs are operating in the coordinated mode or uncoordinated mode, the number of beacon slots for that network, and the offset between the beacon region of the discovered network and the beacon region of the network to which the receiving or hearing STA belongs. The network operating mode in some embodiments may be uncoordinated mode, for example, each CN operates using CSMA, or coordinated, i.e., the beacon structure of one CN is compatible with another. For example, if the first CN 180 allocates a CFP region, the second coordinating CN 150 allocates a stayout region in the matching time interval so that the first CN 180 may freely transmit without contention. If the first CN 180 allocates CSMA, the second coordinating CN 150 may allocate CSMA or alternatively a stayout region. One of ordinary skill in the art would appreciate that various software engineering techniques may be employed to store the discovered stations and networks information, such as via link lists and tables. Furthermore, that the information contained in the discover beacon, as well as the tables or lists maintained, may vary.

In some embodiments, a STA updates its discovered network list when that STA receives and decodes a central, proxy, or discover beacon with a network ID or identification information that is different from the network ID of its own network. In some embodiments, each entry of the discovered network list includes, but is not limited to, the network ID, network operating mode, the number of beacons slots, and the relative start time of the beacon region of that network. In some embodiments, each discovered STA list or discovered network list each includes a last updated field indicating whether the list has been updated from the last time it was broadcasted or requested by the CCO.

On a periodic basis or by request by the CCO, the discovered STA list 408 and the discovered network list 412 of each device are transmitted or relayed to the CCO. This enables the CCO, based on these lists, to generate a network topology graph, for example, via a Topology Table (step 304). The CCO in some embodiments does not broadcast its discovered network list and discovered stations list. This topology information may be made available to other stations within the network or to other CCOs in other networks.

In some embodiments, the CCO maintains the topology table, which may be a composite of the discovered STA lists and the discovered network lists of all the STAs and HSTAs associated and authenticated with the CCO, together with the CCO's own discovered STA list and discovered network list. The topology table typically contains the MAC addresses of all STAs and the network identifiers of all networks discovered by every STA and HSTA associated and authenticated with the CCO. Based on its topology table, a CCO typically identifies the HSTAs, suitable PSTA, and/or suitable PCO for a proxy network (step 310). The CCO may also determine which STA is best suited to fulfill the role of the PCO within a proxy network, the scope of a broadcast (i.e., which STA is able to receive a broadcast from a particular broadcasting STA), and whether bidirectional connections may be established between STAs requesting such a point-point or point-multipoint connection. The CCO may also use the topology table to try to avoid interfering with a neighbor network with which it is not coordinating directly.

Based on the network topology, the CCO may then determine which STA, for example, STA B 120, is able to communicate with the hidden stations, for example, only STA B 120 is able to hear and communicate with hidden stations HSTA D 124 and HSTA E 122. The CCO may then appoint STA B to function as a proxy coordinator or proxy station, such that STA B may relay messages between the HSTAs E 122, D 124 and the CCO.

Typically a CCO generates a central beacon that allocates the BW for the network. However, for hidden stations, they may not hear the central beacons which contain the schedule of the assigned CFP time slots for transmission of their discover beacons. In some embodiments, the PCO relays in the proxy beacons the time slot assignments generated by the CCO, and the HSTA may then look at the schedule contained in the proxy beacon, and use the assigned CFP time slots to transmit a discover beacon. Thus, via the operations discussed above, the HSTAs are typically controlled by the CCO with the PCO serving as a relay and intermediary. An appointed PCO typically transmits proxy beacons once every beacon period in a time interval specified by the CCO. It provides timing and schedule information for the HSTAs in the proxy network. It may include the station or equipment ID of the transmitting STA (the PCO) or any station identification information and the network ID of the network. It may also include BW allocation scheduling of the network, based on the central beacon. The PCO, however, may optionally omit scheduling information, e.g., CFP time slot allocations not related to any of its HSTAs.

Table I shows an exemplary topology table for the CCO 110 or the CN 180. Other information may also be included or determined from information contained in the topology table, such as whether the communication link is bi or uni-directional.

wherein the HSTAs are free to transmit their own discover beacons. In some embodiments, a PCO may augment the central beacon heard before encapsulating that scheduling information into a proxy beacon, to enable the PCO to fine-tune control of the proxy network or to eliminate conflicting or unnecessary information.

Figure 5:
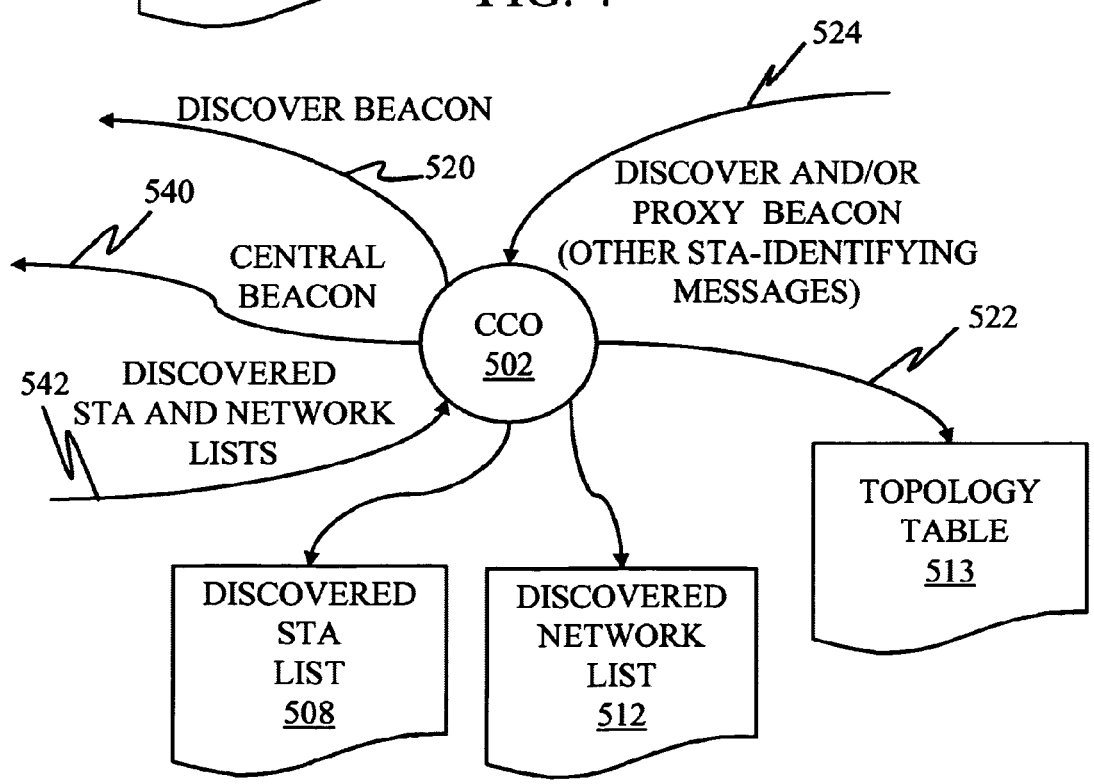
FIG. 5 is a data flow diagram of a central coordinator according to an embodiment of the invention.

FIG. 5 is an exemplary data flow diagram of an exemplary CCO 502 according to some embodiments of the invention. The CCO, depending on network topology, typically also receives discover beacons, proxy beacons, and/or other station-identifying messages 524. Based on these inputs, the CCO updates its own discovered STA list 508 and its own discovered network list 512. The CCO also transmits CCO discover beacons 520. The transmission of CCO discover beacons enables the determination whether the link between the CCO and another device is bi- or uni-directional. The CCO 502 also receives discovered STA and network lists 542 transmitted by the devices within the network. These lists 542 are typically used by the CCO, including its own discovered STA list 508 and its own discovered network list 512, to generate or update the networks topology table 513.

Figure 6:
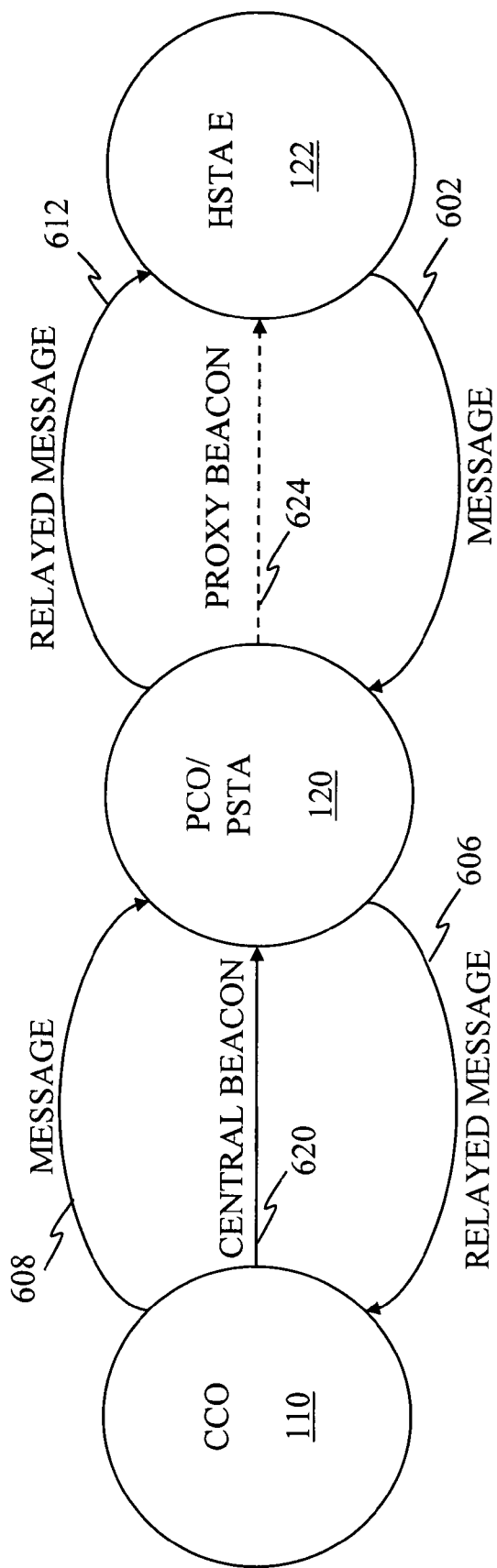
FIG. 6 is a data flow diagram illustrating a process by which messages are relayed between a central coordinator and a hidden station, according to an embodiment of the invention.

FIG. 6 is an exemplary data flow diagram illustrating a process by which a CCO 110 communicates with an HSTA.

TABLE I

| Exemplary List of Associated and Authenticated STAs | Discovered STA Lists | Discovered Network Lists |
| --- | --- | --- |
| MAC ADDRESS(CCO) | {MAC ADDRESS(A), MAC ADDRESS(B), MAC ADDRESS(C)} | {NID(NCo)} |
| MAC ADDRESS(A) | {MAC ADDRESS(CCO), MAC ADDRESS(B), MAC ADDRESS(C), MAC ADDRESS(E)} | {empty} |
| MAC ADDRESS(B) | {MAC ADDRESS(CCO), MAC ADDRESS(A), MAC ADDRESS(C), MAC ADDRESS(D), MAC ADDRESS(E)} | {empty} |
| MAC ADDRESS(C) | {MAC ADDRESS(CCO), MAC ADDRESS(A), MAC ADDRESS(B)} | {empty} |
| MAC ADDRESS(D) | {MAC ADDRESS(B), MAC ADDRESS(E)} | {empty} |
| MAC ADDRESS(E) | {MAC ADDRESS(A), MAC ADDRESS(B), MAC ADDRESS(D)} | {empty} |

An aging mechanism may also be implemented to remove stale entries from the discovered STA list and discovered network list. For example, an entry from the discovered STA list is removed if a discover beacon or other transmission from that STA contained in the list has not been detected for a defined time, for example, a discovered list expire time defined within the system. In some embodiments, an entry from the discovered network list is also removed if a central, proxy, or discover beacon or other transmission from that network or that network has not been detected for at least within a time defined within the system.

Once a PCO is appointed by the CCO (step 310) or by other mechanism, such as self-appointment by the station or by a request by a HSTA, the CCO may now control or manage the activities of the hidden stations via the PCO utilizing proxy beacons. Considering that a PCO also is a PSTA, that PCO may now relay messages between the HSTAs and the CCO. Because the HSTAs have been identified as part of the CN, the CCO, if appropriate may now allocate BW, e.g., CFP time slots for the HSTAs. This scheduling may be sent using a central beacon that is broadcasted in the network, which is then relayed, in one form or another, by the PCO via a proxy beacon to the HSTA. The CCO thus may schedule BW In relaying messages, a PSTA has the sufficient capability to relay messages. A PCO, which is a PSTA, is also able to perform that relay function. In general, a HSTA 122 sends a message 602 that is heard or received by the PCO or PSTA 120. The PCO/PSTA 120 relays that message 606 to the CCO 110. The CCO 110 receives that relayed message and, if appropriate, sends a response message back 608 via the PCO/PSTA 120, which then relays the message sent by the CCO to the HSTA 612. If the PSTA is a PCO, proxy beacons are also broadcasted by the PCO to the HSTA.

Figure 7:
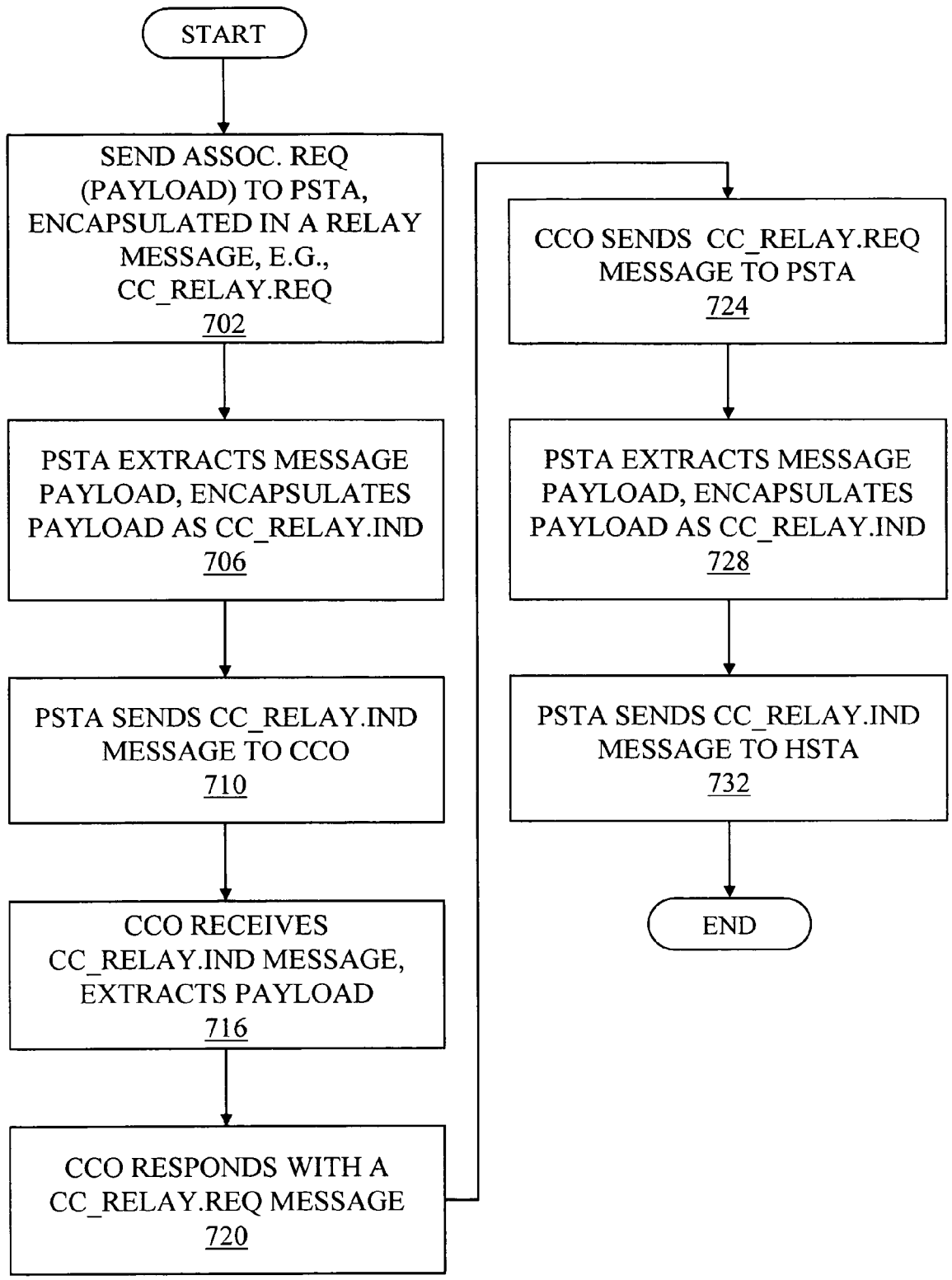
FIG. 7 is a flowchart illustrating in more detail a process by which messages are relayed between a hidden station and a central coordinator via a proxy station, according to an embodiment of the invention.

FIG. 7 is an exemplary flowchart showing in more detail the process by which an HSTA communicates with the CCO and vice versa, thereby enabling the CCO to also control the HSTA. In some embodiments, this is generally initiated by having the HSTA request association with the CCO. This may occur, for example, upon the HSTA realizing that it is a HSTA based on the discover beacons heard. The HSTA may request association, for example, so that it may receive a network encryption key enabling the HSTA to properly decode encrypted messages, as well as properly encode encrypted messages to be sent to the CCO or to other stations in the network. This association request may also be used to indicate to the CCO that the HSTA wishes to be part of the CN.

Messages in the network may be encrypted to ensure privacy within the network. Typically, central beacons, proxy beacons, and discover beacons, however, are sent unencrypted so that unassociated stations, for example, HSTAs may decode network-scheduling information and thus accordingly request association with the CCO. In some embodiments, messages may be partially encrypted.

The initial association request is typically sent unencrypted and the message encapsulated in a manner so that the PSTA, upon receipt of the message, realizes that it is a message to be relayed (step 702). As discussed above, the HSTA may have selected or identified a STA to be used as a PSTA. In some embodiments, the HSTA determines the presence of a PCO, by listening for proxy beacons. In some embodiments, if no PCO is available, i.e., no proxy beacons heard, the HSTA identifies or selects a PSTA. In some exemplary embodiments, the message is encapsulated or constructed such that it is identified as a message to be relayed by the PSTA, e.g., encapsulating the message as a CC_RELAY.REQ message,—e.g., CC_RELAY.REQ (Source, Destination, Relay Message Indicator, Message for Final Destination). The CC_RELAY.REQ message is an exemplary message that is used to request a PSTA or PCO to forward a message payload to a final STA.

The CC_RELAY.REQ message, for example, may contain the MAC address of the final destination STA, e.g., the CCO or any other identifier indicating that the message is to be sent to the CCO, the length of the payload, and the unencrypted message payload or message that is destined for the final station destination. In some embodiments, it may also include the source MAC address or other STA identifier indicating that the message originates from the HSTA. In some embodiments, the CC_RELAY.REQ message may be broadcasted and stations having the ability to function as a proxy station automatically relay the message to the CCO, similar to the operations further discussed below. Other messages, not limited to association requests, may be sent by the HSTA this way.

Upon receiving this message, defined for relay, e.g., a CC_RELAY.REQ, the PSTA extracts the payload, i.e., the message destined for the final destination, then encapsulates that message as a CC_RELAY.IND message (step 706) and then sends that encapsulated message to the CCO (step 710). The CC_RELAY.IND message is an exemplary message that is used to forward a message payload that was originally transmitted by an original source STA to a final destination STA. The exemplary CC_RELAY.IND may include the MAC address of the original source STA that sent the payload, e.g., the HSTA, a terminal equipment identifier—i.e., an alternate station identifier used in the network, the payload length, and the payload—e.g., the associate request message.

The CCO upon receipt of this CC_RELAY.IND message typically recognizes that this is a relay message. This may be indicated by having the message encapsulated as a CC_RELAY.IND or by other fields, for example, as part of the message sent to the CCO. The CCO accordingly extracts the payload (step 716) and accordingly responds to the message, if appropriate. Assuming that the CCO wishes to respond or wishes to send a message to the HSTA, the CCO encapsulates the message to be sent or payload as a CC_RELAY.REQ message (step 720). This message is then sent to the PSTA responsible for that particular HSTA (step 724). The PSTA then extracts the payload from the CC_RELAY.REQ message and encapsulates the message as a CC_RELAY.IND message for the HSTA (step 728). The PSTA then accordingly transmits the CC_RELAY.IND message to the HSTA (step 732). In some embodiments, the CC_RELAY.IND encapsulation is handled via a field that identifies that this message is a relay message from the CCO via the PSTA.

Figure 8:
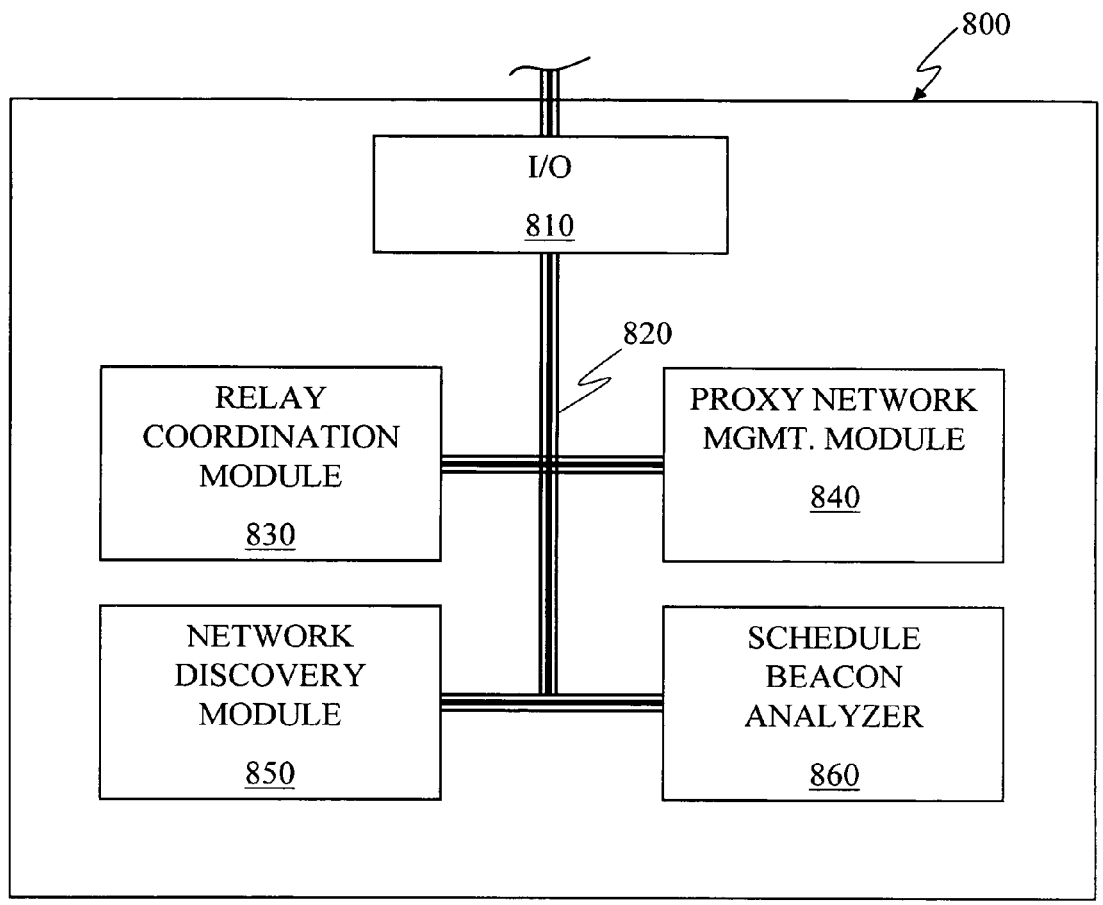
FIG. 8 is a high-level functional block diagram of an exemplary proxy coordinator according to an embodiment of the invention.

FIG. 8 is a high-level block diagram of an exemplary proxy coordinator 800 according to some embodiments of the invention. In some embodiments, an input/output (I/O) interface 810 couples the PCO 800 to the CN, enabling communication with other devices in the network. In some embodiments, a PCO 800 includes a relay coordination module 830 that performs the receiving, encapsulation, and decapsulation or extraction of messages that are to be sent between two stations, e.g., HSTA and the CCO, such that the PCO is able to perform the relay functions described herein. The proxy network management module 840 performs the proxy networking functions of the PCO, including, but not limited to, receiving and decoding central beacons, and sending out proxy beacons, BW allocation of the proxy network stations in accordance with central beacons or CCO allocation. The proxy network management module thus performs the function of managing and controlling the proxy network. The network discovery module 850 performs the functions of the discover process, which may include, the ability to generate and transmit discover beacons, update and transmit its discovered network and station lists, transmit request for discovery beacons, determine HSTAs, and the like. Typically, the PCO also includes a schedule beacon analyzer module 860, which decodes the beacons containing scheduling information, e.g., central beacons, proxy beacons, and discover beacons, thereby enabling the PCO to comply or follow the network scheduling information defined within these beacons. In some embodiments, the different modules may communicate and interface with each other via a bus, dedicated signal paths or one or more channels 820. This functional block diagram typically also applies for a PSTA, a hidden STA, and non-hidden STA, however, typically without the proxy network management module 840.

Figure 9:
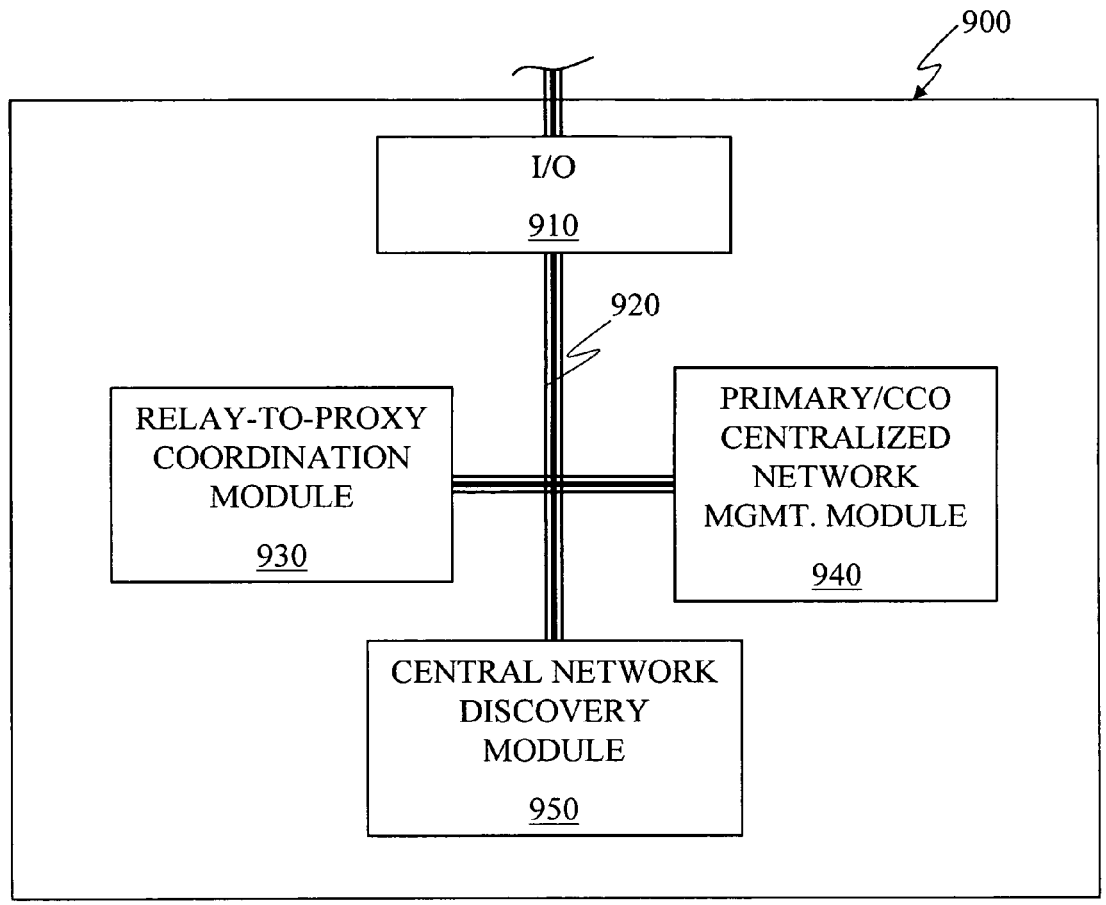
FIG. 9 is a high-level functional block diagram of an exemplary central coordinator according to an embodiment of the invention.

FIG. 9 is a high-level block diagram of an exemplary central coordinator 900, according to some embodiments of the invention. In some embodiments, an I/O interface 910 couples the CCO 900 to the network, enabling communication with other devices in the network. In some embodiments, a CCO also includes the relay-to-proxy coordination module 930 such that the CCO is able to read relayed messages from PCOs or PSTAs and accordingly encapsulates messages that are to be relayed by such proxy stations. The central network discovery module 950 performs the functions of the discover process, which may include, the ability to generate and transmit discover beacons, update and transmit its discovered network and station lists, transmit request for discovery beacons, determine HSTAs, PSTAs, and PCOs, and generate and update its CCO topology table. The primary/CCO centralized network management module 940 performs the centralized network scheduling and BW allocation functions of the CCO, which may include coordinating with other CCOs in other neighbor networks, granting requests for network association from devices within the network, scheduling BW allocation requests from stations within the CN, and broadcasting central beacons.

The embodiments of the present invention thus provide a mechanism wherein a hidden station and a CCO may exchange requests/responses between each other via a proxy station thereby enabling these devices to perform their functions as if the hidden station and the CCO are within range of each other. The embodiments of the present invention thus also provide a mechanism enabling the hidden station to be managed by the CCO.

One of ordinary skill in the art will appreciate that the components or various modules of the PSTA, STA, CCO, and the PCO, as described above, may be varied and still be in accordance with the embodiments of the invention. For example, the various modules may be further subdivided into more granular modules as well as have all the modules be integrated into just one or multiple modules, and the functions of some modules may also be carried out by other modules. The components or modules may be implemented in hardware, software, or both.

Embodiments of the present invention may be used in conjunction with networks that comply with standards or other power line communication standards. Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of communication between a first device and a second device within a centralized network, the centralized network comprising a central coordinator managing network activities of the centralized network and a proxy station, the method comprising the steps of:
    sending by the first device, unable to decode messages sent by the second device, a message comprising a message payload and at least one indicator identifying that the message is to be relayed by the proxy station;
    extracting, by the proxy station, the message payload from the sent message from the first device;
    sending by the proxy station, a relayed message comprising the extracted message payload and at least one indicator identifying that the message is for the second device;
    extracting by the second device, the extracted message payload from the relayed message;
    receiving at least one of the central beacons by the proxy coordinator, wherein the proxy coordinator manages bandwidth allocation of a proxy network, wherein the at least one hidden stations is part of the proxy network;
    updating a discovered station list based on the received beacons; and
    updating a discovered network list based on the received beacons.

2. The method of claim 1 wherein the first device is a hidden station and the messages that are not decoded by the first device are central beacons transmitted by the second device, and wherein the second device is the central coordinator.

3. The method of claim 1 further comprising the step of determining the proxy station.

4. A method of managing a centralized network, the network comprising a central coordinator, a proxy station, and at least one hidden station, the method comprising the steps of:
    transmitting, by the central coordinator (CCO), a CCO discover beacon comprising information identifying the CCO;
    transmitting, by the proxy station (PSTA), a PSTA discover beacon comprising information identifying the PSIA;
    transmitting, by the at least one hidden station (HSTA), an HSTA discover beacon comprising information identifying the HSTA;
    updating, by the CCO, a CCO discovered station list and a CCO discovered network list based on the PSTA discover beacon;
    updating, by the PSTA, a PSTA discovered station list and a PSTA discovered network list based on the CCO discover beacon and the HSTA discover beacon; and
    updating, by the CCO, a network topology based on the CCO discovered station list, the CCO discovered network list, the PSTA discovered station list, and the PSTA discovered network list.

5. The method of claim 4 further comprising the step of:
    updating by the HSTA an HSTA discovered station list and an HSTA discovered network list based on the PSTA discover beacon.

6. The method of claim 5 further comprising the step of:
    relaying by the PSTA the HSTA discovered station list and the HSTA discovered network list to the CCO.

7. The method of claim 6 wherein the step of updating the network topology is further based on the relayed HSTA discovered station list and the HSTA discovered network list.

8. The method of claim 4 further comprising the step of:
    identifying the at least one hidden station as a hidden station by the CCO.

9. The method of claim 8 further comprising the step of:
    appointing a proxy coordinator to manage the identified at least one hidden station.

10. The method of claim 8 wherein the appointed proxy coordinator is the proxy station.

11. A centralized network device comprising:
    a discovery module configured to:
        transmit beacons identifying the device;
        receive beacons from the one or more stations identifying the one or more stations in the centralized network;
        update a discovered station list based on the received beacons;
        update a discovered network list based on the received beacons;
        transmit the discovered station list; and
        transmit the discovered network list;
    a schedule beacon analyzer module operably coupled to the discovery module and configured to:
        determine network scheduling information based on beacons received by the device; and
    an input/output interface operably coupled to the discovery module and the schedule beacon analyzer module.

12. The device of claim 11 wherein the discovery module is further configured to:
    determine that the device is a hidden station.

13. The device of claim 11 further comprising:
    a relay coordination module operably coupled to the input/output interface and configured to:
        encapsulate a message payload to be relayed; and
        extract a message payload.

14. The device of claim 13 wherein the relay coordination module further configured to transmit an encapsulated message payload to be relayed.

15. The device of claim 11 further comprising:
a proxy network management module operably coupled to the input/output interface and configured to:
transmit proxy beacons based on the determined network scheduling information determined by the schedule beacon analyzer module.

16. A centralized network device comprising:
a discovery module configured to:
receive beacons identifying the device;
receive beacons from the one or more stations identifying the one or more stations in the centralized network;
update a device discovered station list based on the received beacons;
update a device discovered network list based on the received beacons;
receive discovered station lists from the one or more stations in the centralized network;
receive discovered network lists from the one or more stations in the centralized network; and
generate a network topology information based on the device discovered station list, the device discovered network list, the discovered stations lists from the one or more stations, and the discovered network lists from the one or more stations;
a network management module configured to:
transmit central beacons comprising network scheduling information for the one or more stations in the centralized network;
a relay-to-proxy module configured to:
encapsulate a message payload to be relayed; and
extract a message payload; and
an input/output interface operably coupled to the discovery module and network management module.

17. The device of claim 16 wherein the discovery module is further configured to determine hidden stations from the one or more stations in the centralized network.

18. The device of claim 17 wherein the discovery module further configured to determine a proxy station that relays messages from one station to another station from the one or more stations in the centralized network.

19. The device of claim 17 wherein the discovery module further configured to determine a proxy coordination that manages the one or more hidden stations using proxy beacons comprising network-scheduling information.

* * * * *